United States Patent [19]

Collina et al.

[11] 3,812,464

[45] May 21, 1974

[54] MULTIPLE ADAPTIVE DECODING SYSTEM FOR BINARY MICROINSTRUCTIONS

[75] Inventors: Giancarlo L. Collina, Cermenate; Giancarlo Tessera, Milano, both of Italy

[73] Assignee: Honeywell Information Systems Italia, Milan, Italy

[22] Filed: Dec. 26, 1972

[21] Appl. No.: 317,894

[30] Foreign Application Priority Data

Dec. 29, 1971 Italy ............................ 33063/71

[52] U.S. Cl. ............................ 340/172.5

[51] Int. Cl. ............................ G05b 15/00, G06f 15/20

[58] Field of Search ............................ 235/152; 340/172.5

[56] References Cited

UNITED STATES PATENTS

| | | | |
|---|---|---|---|
| 3,325,788 | 6/1967 | Hackl | 340/172.5 |
| 3,422,404 | 1/1969 | Ferguson | 340/172.5 |
| 3,543,245 | 11/1970 | Nutter | 340/172.5 |
| 3,560,933 | 2/1971 | Schwartz | 340/172.5 |
| 3,657,705 | 4/1972 | Mekota et al. | 340/172.5 |

*Primary Examiner*—Paul J. Henon
*Assistant Examiner*—Michael Sachs
*Attorney, Agent, or Firm*—Fred Jacob

[57] ABSTRACT

A binary data handling system is provided wherein logical and arithmetical operations are controlled by microinstructions stored in a read only memory. To minimize the maximum word length required for the read only storage in the system, a function code of variable length is used which has a fixed length equal to the minimum length required for all function codes and a function code complement of variable length.

2 Claims, 4 Drawing Figures

MULTIPLE ADAPTIVE DECODING SYSTEM FOR BINARY MICROINSTRUCTIONS

BACKGROUND OF THE INVENTION

The present invention relates to binary data handling systems wherein the different logical and arithmetical operations to be executed are controlled by a set of microinstructions stored in a read-only memory contained in said systems, that is, to so-called microprogrammed computers, as defined and explained hereafter.

It is known that binary electronic computers are designed and built in order to execute a predetermined set of instructions, for example:

Binary sum, binary subtraction, decimal sum, decimal subtraction, to write in register from a memory cell, shift, compare and so on.

These instructions only are available to the programmer, who in building up the working programs for the computer, must use these instructions without considering the way in which they are carried out by the computer.

Practically, as regards the computer, such instructions comprise a succession of groups of elementary operations, such as the setting up of predetermined circuits of a logic network, or the transfer of suitable electrical signals across the electrical network.

These elementary operations are called "microoperations," and the set of microoperations executed simultaneously, that is, in a single elementary clock interval is called a "microinstruction." The sequence of microinstructions needed for carrying out a single program instruction is a "microprogram."

Until some years ago, the method of executing such microoperations, microinstructions and microprograms depended on the manner in which the computer was designed and built, that is, it depended on the so-called hardware of the computer. In other words, the correlation between the program instructions and the microoperations needed to execute the same, was defined by the physical structure of the control unit of the computer and therefore could not be changed without changing such physical structure, that is, the wiring and the logical components of the control unit of the computer.

During the last few years, however, attempts have been made to make the computer more flexible than before, and to render it capable of executing different sets of machine instructions according to the requests of different users, remaining, of course, inside the limits of the intrinsic capacities allowed by the available set of microoperations. This allows the computer, for instance, to emulate the operation of different computers, or to extend the set of instructions beyond the former limits.

To achieve this object, without changing the hardware of the machine, it was necessary to break-up the one-to-one correlation between instructions and microoperations imposed by the structure of the machine, and to establish such correlation in an indirect way, by the use of a memory device, capable of delivering a set of information, each one corresponding to a microoperation, in response to an instruction, said set of information being stored in the memory device and being capable of controlling the execution of the corresponding microoperations.

By modifying the contents of such memory device, it is possible to organize the set of microoperations differently, and as a result to obtain the execution of the set of instructions of different machine languages, without changing the circuitry of the computer.

The modern computer is therefore constructed according to such criteria, and comprises a non-destructive, modifiable memory called ROS (Read Only Storage) containing the information capable of controlling the microoperations. The ROS stores a plurality of words, each one comprising a plurality of bits, and each machine instruction is an address for the ROS, causing the read-out of one or more ROS words in succession.

The bits of each read-out ROS word specify a microinstruction to be executed, that is, a set of microoperations.

The simplest way of using such information is to assign each bit for controlling a single microoperation. Thus, for example, the binary value of a bit position is ONE if it is desired that the corresponding microoperation be carried out, and is ZERO in the opposite case. As the number of microoperations which can be carried out in a computer, may be of the order of several hundreds, a one-to-one correspondence between bits and microoperations would require words of exaggerated length and therefore ROS memories of high capacity, and high cost.

Designers have therefore tried to substantially reduce the capacity of the ROS memory required for containing the needed microinstructions, by the following different methods.

A first method consists of grouping the mutually intrinsically exclusive microoperations, that is, those microoperations which are such that no two of them can be carried out in a same clock interval, and representing each microoperation of every group in coded form. Thus, a noteworthy reduction in the length of the ROS word is obtained, without imparing the possibility of adapting the contents of the ROS to the specific requirements of the user, as the one-to-one correspondence between bit groups and groups of mutually exclusive microoperations is maintained, and therefore no change in the circuits is required.

However, this reduction may not be considered as sufficient.

In order to obtain a further reduction in the length of the microinstructions, the microoperations may be divided into groups of extrinsically mutually exclusive ones that is, such that no two of them may be executed in the same microinstruction at least by a determined user. However, this requires a specialized decodifying network, that is a specialized hardware, thus limiting the ability to modify the microprograms contained in the ROS. The flexibility of the computer is thus partly lost.

Another means for obviating the aforesaid inadequacies, is the so-called "adaptive decoding," according to which a predetermined number of bits of each word is used for interpreting the remaining bits of the same word: these bits act as a "function code" for determining the significance and the function of the remaining bits. Every time the function code is modified, the remaining bits assume a different significance, that is, are assigned to the control of a different set of microoperations. These remaining bits directly control the set of microoperations without a need for further decoding.

Therefore, for each set of microoperation determined by a code function, there is a remarkable freedom in modifying the microinstructions without acting on the circuitry of the computer, and, at the same time, a remarkable reduction in the length of the microinstruction words is reached.

It is self-evident that, the greater the number of sets of microoperation which can be controlled by the function code, that is, the greater the information contents of the function code, the greater is the possibility of modifying the microinstruction, and the more versatile the computer.

Therefore, code functions having a high number of bits are required to accomplish this; thus, either the number of bits directly controlling the microoperations is reduced, if the word has a fixed length, or a longer word is required, if the number of control bits is fixed.

The present invention obviates the aforesaid inadequacies by using a decoding system that may be called "multilevel adaptive decoding," which employs, in addition to the aforesaid function code, an extension of the same called a "function code complement."

SUMMARY OF THE INVENTION

The invention is based on the consideration that the control of a microinstruction does not always require the same number of bits, but, on the contrary, may be obtained by control words of different length. On the other hand, the ROS must be capable of containing words of the maximum required length: thus, if a number of microinstructions calls for a lesser length of the words, a number of bits is unused.

In order to reduce to a minimum the maximum word length required for the ROS', the present invention uses a function code of variable length, instead of one of fixed length, that is, it assigns to the shorter function codes the microinstructions requiring the greater number of microoperations, whereas longer function codes are assigned to the microinstructions comprising the lesser number of microoperations. Thus the maximum required length of the word is reduced. It is also clear that, if the code function has a variable length, its length must always be specified.

This is most easily accomplished by dividing the function code into two parts: a proper function code, having a fixed length equal to the minimum length required for all function codes, and a function code complement of variable length. The proper function code, when decodified, allows one to interpret the following bits either as control bits for the microoperation or as code function complement bits, which increase its information content and, by means of a further decoding, allows the interpretation of the remaining bits. This decoding process, which takes place in two distinct decoding phases, justifies the name attributed to the decoding system of the invention as "multilevel adaptive decoding."

BRIEF DESCRIPTION OF THE DRAWING

These, and other advantages and features of this invention will be better understood by reference to the detailed description of a preferred embodiment thereof, with references to the attached drawings, in which.

DESCRIPTION OF A PREFERRED EMBODIMENT

Figure 1:
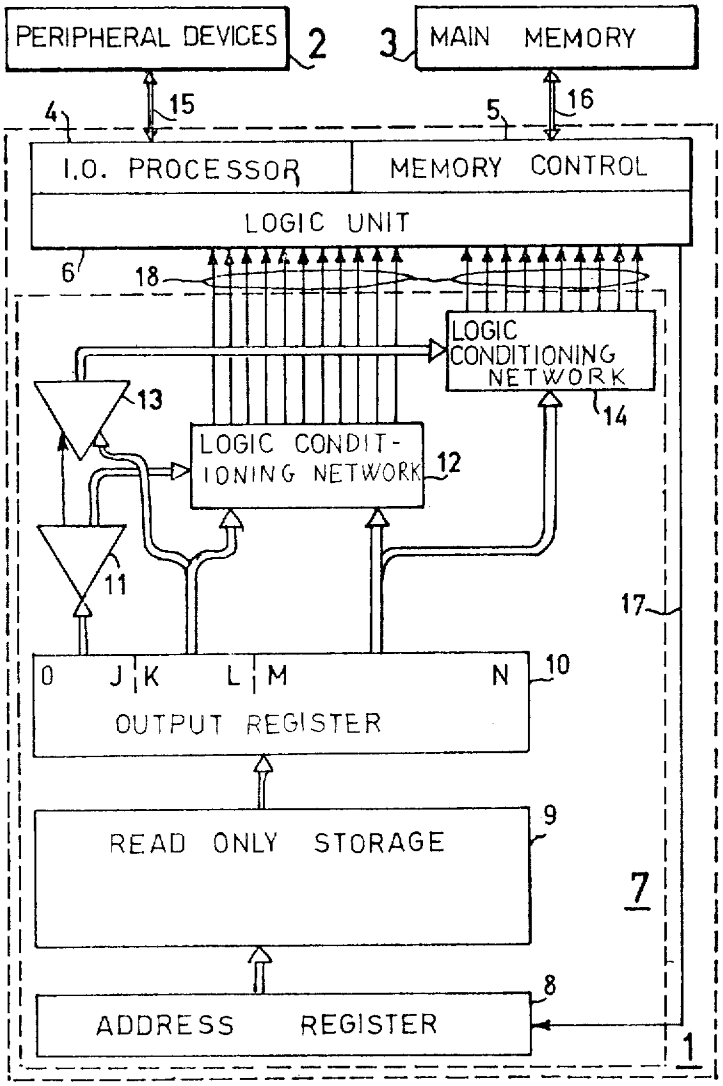
FIG. 1 is a schematic block diagram of a microprogrammed binary computer, comprising a logical network for multiple adaptive decoding according to the invention.

In FIG. 1 is shown a schematic logical block diagram of a data processing system employing a non-destructive read-out memory (ROS) as a control device.

The system comprises a central processor 1, a plurality of peripheral devices 2 for information handling, such as card readers or punches, printers, tape or disk units for magnetic recording, and a main memory 3.

The central processor 1 may be functionally divided into four sections, which are:

- a control unit for controlling the transfer of information, signals and commands between the peripheral units and the central processing unit, that is an "input-output processor" 4;
- a control unit 5 for controlling the main memory 3, that is a "Memory Control";
- a "Logic Unit" 6 for logically processing the information; and
- a microprogramming control unit 7, which controls the execution of the sequence of microoperations by the remaining units being part of the central processor.

The microprogramming control unit 7 comprises in turn:

- a read only storage (ROS) 9;
- an address register 8 for the ROS (ROSAS);
- a ROS-output register 10 (ROS-R);
- a first decoding network 11 and a first logical conditioning network 12; and
- a second decoding network 13 and a second logical conditioning network 14.

The central processor 1 is connected to the peripheral devices 2 and to the main memory 3 by means of input-output channels 15 and 16.

A similar channel 17 is provided for sending information, namely addresses, from the logic unit 6 to the microprogramming unit 7, and another, represented by the set of wires 18, is used for sending information, namely microinstructions, from the microprogramming control unit 7 to the logic unit 6.

In addition, the main processor is provided with suitable clock devices, with the necessary feeding units, and with an operative console, for starting the operations and for setting up particular logical or electric conditions. All these devices are not represented.

The operation of the computer system is known: in response to proper starting command, set up, for instance, by means of keys on the operative console, a suitable memory position of the ROS 9 is addressed, and consequently, the register 10 is loaded with a microinstruction. The binary word representing such microinstruction is transferred, thru the logical conditioning networks 12 and 14 to the logical unit 6, thus effecting a corresponding set of microoperations.

A part of the binary word representing the microinstruction is decoded by the decoder 11, and if it be the case, also by decoder 13, delivering a set of conditioning signals which accordingly modify the logic conditioning networks 12 and 14.

The set of signals controlling the microoperations therefore depends on said part of the binary word, which is called a "function code."

The microoperation command signals put the logical unit 6 in a predisposed state, thereafter executing the desired operations, such as reading out data, or program instructions from the main memory 3 or from one of the peripheral devices 2, or any internal operation.

At the same time the logical unit 6, through channel 17 loads the register 8 with another address for the ROS memory: therefore a new set of microoperation control signals is applied to the logical unit 6, controlling the carrying out of a new set of operations.

These operations are timed by suitable clock devices, not represented, which are usually controlled by the logical unit.

A further detailed description of the system lies outside the scope of the invention, which is limited to the ways of handling the microinstruction words in order to obtain therefrom a set of microoperation control signals, and to the description of the logical network to effect this. Therefore, FIG. 2 is again considered with reference to the microinstruction decoding network. The microinstruction contained in the register 10 comprises N + 1 bits, which may be considered as divided into the following three groups: O to J, K to L, M to N, extremes included.

The bits O to J form the function code and are applied to corresponding inputs of a decoder 11, which controls, by its outputs, the logical conditioning network 12.

The remaining bits, from K to N are applied to corresponding inputs of the logical conditioning network 12, which assigns such bits to specific microoperations according to the function code controlling the conditioning network.

The aforesaid structure of the microinstructions, and the interpreting logical network, which comprises essentially the decoder 11 and the conditioning network 12 are known, and are described for instance in U.S. Pat. No. 3,560,933 and assigned to Honeywell Inc.

However, the present invention provides, in addition, a certain subset of bits, from K to L, forming the so-called function code complement, and applied not only to the inputs of the conditioning network, but also, together with some signals decoded by decoder 11, to the inputs of a second decoder 13, whose outputs control in turn a second conditioning network 14.

The remaining bits, M to N, are applied to the conditioning network 12 and also to the second conditioning network 14, controlled by the decoder 13.

These bits may therefore, according to the function code and to the code function complement, be assigned to microoperations not comprised among these assigned by the conditioning network 12. Thus the information contents of the microinstruction is increased, without increasing the length of the microinstruction.

Figure 2:
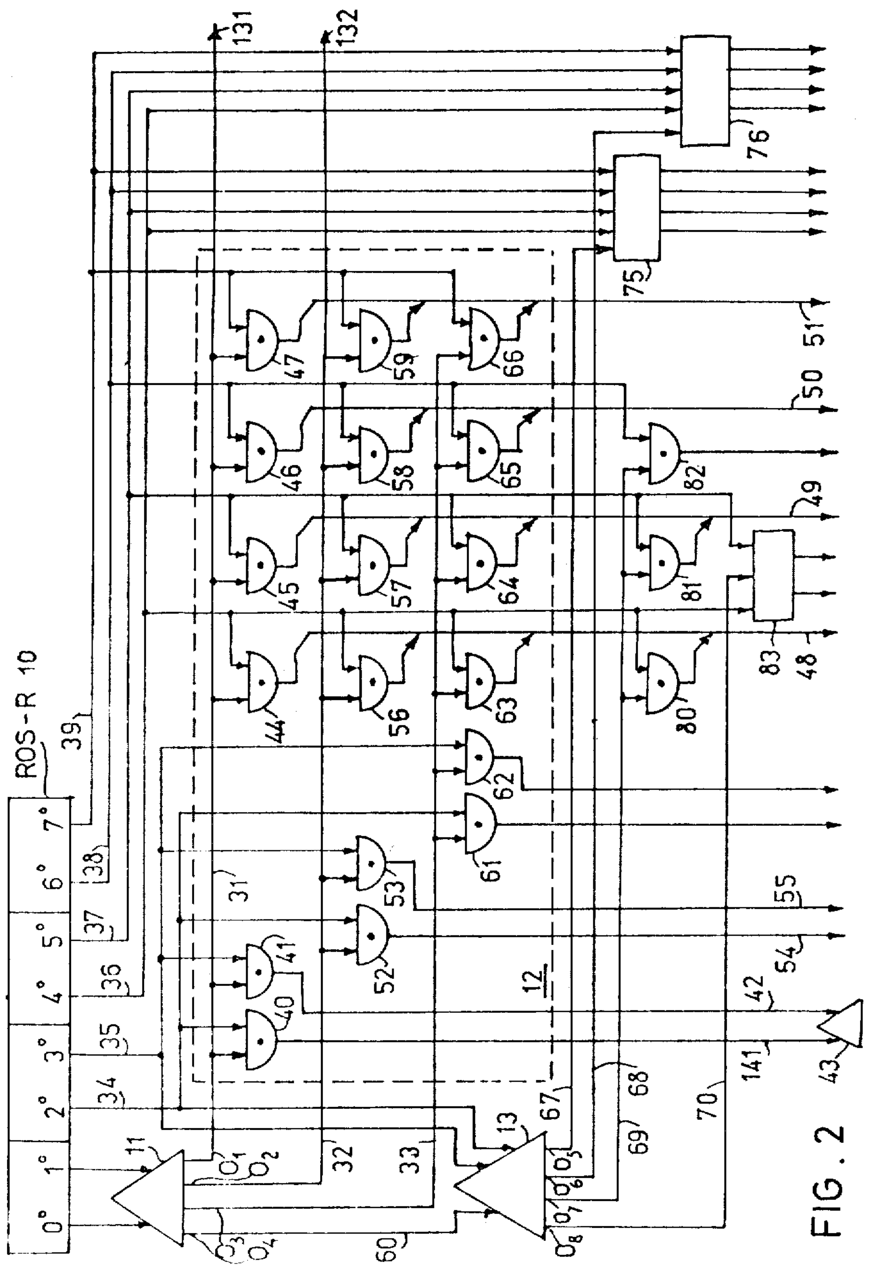
FIG. 2 is a logical block diagram of a preferred embodiment of said adaptive decoding network according to the invention.

FIG. 2 illustrates in greater detail for clarity sake, the multilevel adaptive decoding system, already described with reference to FIG. 1.

In the example represented by FIG. 2, the microinstructions are assumed to comprise 8 bits, the first two of them forming the function code, and the following two forming, if so defined by the function code, a function code complement.

As shown by FIG. 2, the microinstruction to be executed is read out from the ROS memory and loaded into the ROS-R register 10.

The first two bits, of order 0 and 1, contained in the register are applied to the decoder 11, which is provided with four outputs, one for each of the four possible code combinations of the two bits. In the example, all the information capacity of the two-bits function code is exploited; in practice, the information contents of a several-bits function code may not be fully exploited, to simplify the decoder.

Figure 2A:
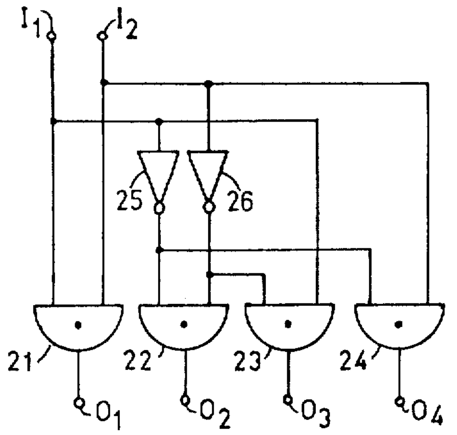
FIG. 2*a* is a logical diagram of a first embodiment of a decoder.

FIG. 2a illustrates a possible embodiment of a decoding network using elementary logic gates: it consists of four two-input AND gates 21, 22, 23, and 24, and two inverters 25 and 26.

The inputs $I_1$ and $I_2$ of the decoder are connected directly to the two inputs of the AND gate 21, and respectively to the inputs of inverters 25 and 26.

The outputs of inverters 25 and 26 are connected to the inputs of AND gate 22. The inputs of the AND gate 23 are respectively connected to the input $I_1$, and to the output of inverter 26 and the inputs of AND gate 24 respectively to input $I_2$ and to the output of inverter 25.

The outputs of the AND gates 21 to 24 are the outputs $O_1$, $O_2$, $O_3$, and $O_4$ of the decoder. It may immediately be verified that each combination of the binary code applied to inputs $I_1$, $I_2$ provides a binary level ONE on a single output.

The two-bits input code is the function code, and the different output signal may be assigned each to a function command signal which acts on the conditioning network and specifies the operation assigned to the remaining bits of the microinstruction.

In the example considered, for instance, the code "11," which originates a command signal on output $O_1$, may be assigned to the decimal arithmetic operations: the code "01," which originates a command signal on output $O_2$, may be assigned to binary arithmetic operations; code "10," which originates a command signal on output 03, may be assigned to logical operations; and code "00," which originates command signal on output $O_4$, may be assigned to remaining operations.

Now again, considering FIG. 2, the outputs $O_1$, $O_2$, and $O_3$ are connected to conductors 31, 32, and 33 which will be called hereafter "distributors." Such conductors distribute the different conditioning signals to the inputs of the first conditioning network 12, which is formed by the group of AND gates contained in the broken line rectangle indicated by 12.

The conditioning network 12 also receives through leads 34 to 39, which will be called "conveyors," signals representative of the microinstruction bits from 2 to 7, which are interpreted by the conditioning network and transferred, by conductors called "collectors," to the devices for executing the microoperations controlled by such bits.

Consider for instance the distributor 31. The command carried by such distributor enables the AND gates 40 and 41 to transfer the electrical signals present on conveyors 34 and 35 (representative of the 2° and 3° microinstruction bits), on the connectors 141 and 42. Such connectors may be connected to the command inputs of a decimal arithmetic unit, and accordingly to whether a command signal is present on the one or the other connector, the adding or the subtracting operations are alternatively effected. In other words, the function code, by means of the signal on distributor 31 interprets the 2° and 3° bit as command signals for the decimal microoperations of adding and of subtracting.

In the case of the example, as it is assumed that and adding and a subtracting operation cannot be executed at the same time by the same arithmetical unit, such microcommands (commands of microoperations) may be represented in codified form. Accordingly, the connectors 141 and 42 are connected to the input of a decoder 43, identical to the one represented in FIG. 2*a*, whose outputs may command respectively the decimal operations of adding, subtracting, multiplying and dividing.

To accomplish an arithmetical operation, an operand and an operator are needed. Therefore, the function code serves, through the signal on the distributor 31, to interpret the 4° and 5° microinstruction bit, applied to the conveyors 36 and 37, and the 6° and 7° bits (on conveyors 38 and 39), as addressed of the registers where the operand and the operator are stored. The interpretation is effected by enabling the AND gates 44 to 47 through wire 31 to transfer the signals representing these bits on the connectors 48 to 51, controlling the reading out of the contents of the addressed registers to the arithmetic unit; if needed, the control may occur by means of proper decoders.

It is clear that other elementary operations, specifically related to the function designated by the function code, may be controlled in a direct way by the distributor 31, as shown by the extension of the lead 31 represented by the arrow 131.

In the same way, considering the distributor 32, the function code assigned to a "binary arithmetic" operation provides a signal on distributor 32, which enables the AND gates 52 and 53 to transfer on the connectors 54 and 55 the signals representative of the 2° and 3° bits of the microinstruction. These signals define the type of binary operation to be executed (add, subtract, multiply, divide) and, after decoding, control the execution thereof.

At the same time the 4° and 7° microinstruction bits are interpreted, by the AND gates 56 to 59, as addresses for the operand and operator, and transferred to collectors 48 to 51. Other operations, specifically related to the arithmetic binary function, may be controlled by the same lead 32, as indicated by the arrow 132.

The operation of the command signal on the distributor 33 which is related to the logical operations is entirely the same, and by means of the AND gates 61 to 66 interprets the 2° and 3° bit of the microinstruction as indicators of the type of logical function to be executed (AND, OR, Exclusive-OR, Compare), and the remaining bits as addresses of the data on which to operate.

It may be observed at this point that the interpretation of the microinstruction bits by the function code, as described above, and the interpretation of the remaining bits by means of the function code are comprised in the present state of the art.

To understand the present invention, however, the effects produced by a signal present on the output $O_4$ of the decoder 11, related the function code specifying "other operations" must also be considered. The lead 60, carrying the output signal of $O_4$ is not used as a distributor, but as a signal enabling the interpretation of a predetermined number of bits (in the example the 2° and 3° bits) as a function code complement.

The leads 34 and 35, conveying the signals representative of these bits are connected, not only to the first conditioning network 12, but also to the second decoder 13, which is conditioned by the signal present on lead 60.

Figure 2B:
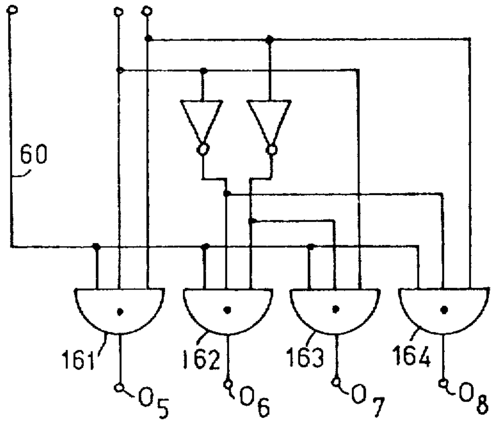
FIG. 2*b* is a logical diagram of a second embodiment of a decoder.

FIG. 2*b* represents a possible embodiment of such a conditioned decoder. It differs from the decoder represented in FIG. 2*a* only by the fact that the AND gates have three inputs, and the third input is controlled by the signal on lead 60. Therefore, a decodified signal appears on one of the outputs $O_5$ to $O_8$, only if an enabling signal is present on the lead 60.

The signals on the outputs $O_5$ to $O_8$ specify the function to be executed. For instance, a signal $O_5$ may control a directly addressed jump of the microprogram, or of the program, a signal on output $O_6$ may control an indirectly addressed jump, also of the program or of the microprogram, a signal on lead $O_7$ may enable the operation of the main memory, either for reading or for writing, and a signal on output $O_8$ may enable an input-output operation to, or from, a peripheral device.

The outputs $O_5$ to $O_8$ are connected to corresponding distributors 67, 68, 69 and 70, and the signals present on these leads, obtained by a two-level decoding of the function code and of the 2° and 3° bits, representative of the function code complement, allow the interpretation of the remaining microinstruction bits.

Consider for instance the distributor 67 controlling the directly addressed jump function.

In this case the remaining microinstruction bits (4° to 7°) will be interpreted as the address of the next microinstruction to be read-out: therefore a signal present on lead 67 enables the transfer of the signals, present on conveyors 36 to 39, through a set of AND gates, represented, as a whole, for simplicity, by the block 75, to a set of four connectors, directly addressing the ROS. The set of AND gates 75 resembles the set of AND gates 44, 45, 46 and 47 and comprises four AND gates receiving inputs from conveyors 36 to 39, respectively, the gates being enabled by the signal on lead 67. In the case of an indirectly addressed jump, that is, of a signal present on distributor 68, the remaining microinstruction bits are interpreted as an address complement to be added to the address of the present microinstruction. Therefore, the signal on lead 68 enables the transfer of the signals present on conveyors 36 to 39, through the AND gates of block 76, to a set of four connectors, which in turn control a counter for computing the effective address for the ROS. The set of AND gates 76 resembles the set of AND gates 44, 45, 46 and 47 and comprises four AND gates receiving inputs from conveyors 36 to 39, respectively, the gates being enabled by the signal on lead 68.

In like manner, if the operation to be executed is a writing or reading memory operation, the lead 69 enables the AND gates 80 and 81, and allows the bits 4° and 5° to be interpreted as the address of a memory register where the effective address of the memory location is contained. The 6° bit is interpreted, through the AND gate 82, as specifying if the operation to be performed is writing or reading, and to the 7° bit another specific function may be assigned. For instance, in case of a main memory having a parallelism different from that of the machine, the bit may specify if the writing or reading operation, in the case of a "two-byte" memory, concerns the first or the second byte.

If the function to be executed is a data transfer to, or form, a peripheral device, the lead 70 enables the group of AND gates represented by the block 83 and allows the interpretation of the 4° and 5° bits as an address code of the concerned peripheral device and the remaining bits may specify the direction of the data transfer or other conditions. The group of AND gates 83 resembles the group of AND gates 40 and 41 and comprises two AND gates receiving inputs from conveyors 36 and 37, respectively, the gates being enabled by the signal on lead 70.

The conditioning logic elements controlled by the signals provided by the decoder 13, namely the sets of AND gates 75 and 76, AND gates 80 81, and 82, and the group of AND gates 83, form the conditioning network indicated in FIG. 1, by the block 14.

It is self-evident that the diagram of FIG. 2 is to be considered simply as an example, and is directed only to a clear understanding of the invention. Indeed, many are the modifications of the said diagram which can be carried out without departing from the spirit and scope of the invention and which may be requested by specific design or performance characteristics of the computer.

The substance of the invention does not consist in the described arrangement of circuital means, but in the fact that the decoding of the microinstruction is executed by interpreting a second portion of the same by means of a variable-length first portion of the same.

What is claimed is:

1. A control device for data handling apparatus, comprising, in combination, storage means for storing a plurality of microprogram instructions, a read-out register for temporarily storing a microprogram instruction comprising a first field divided into a function code and a function code complement and a second field, decoding means for decoding said function code and said function code complement into a first set of conditioning signals and a second set of conditioning signals, first interpreting means responsive to said first set of conditioning signals for interpreting the bits of said function code complement and said second field for indicating specific microoperations, and second interpreting means responsive to said second set of conditioning signals for interpreting the bits of said second field for indicating specific microoperations.

2. A control device, for data handling apparatus, comprising, in combination:

storage means for storing a plurality of microprogram instructions;

a read-out register for temporarily storing a microprogram instruction comprising a first field divided into at least a function code a function code complement and a second field;

first decoding means for decoding said function code into a first set of conditioning signals;

first logical conditioning means connected to the output of said read-out register and to outputs of said first decoding means for using the bits of said function code complement and said second field to form a first set of micro-operations command signals;

second decoding means connected to outputs of said read-out register and to outputs of said first decoding means for decoding said code complement into a plurality of second conditioning signals in response to prefixed conditioning signals in said first set; and second logical conditioning means connected to outputs of said read-out register and to outputs of said second decoding means for using the bits of the second field to form a second set of micro-operation command signals.

* * * * *